United States Patent
Tan

(10) Patent No.: US 10,871,643 B2
(45) Date of Patent: Dec. 22, 2020

(54) DISPLAY PANEL AND DISPLAY DEVICE

(71) Applicant: BOE TECHNOLOGY GROUP CO., LTD., Beijing (CN)

(72) Inventor: Jifeng Tan, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 228 days.

(21) Appl. No.: 16/025,157

(22) Filed: Jul. 2, 2018

(65) Prior Publication Data
US 2019/0204583 A1  Jul. 4, 2019

(30) Foreign Application Priority Data

Jan. 3, 2018  (CN) .......................... 2018 1 0005113

(51) Int. Cl.
*G02B 26/00* (2006.01)
*G09G 3/34* (2006.01)
(Continued)

(52) U.S. Cl.
CPC .......... *G02B 26/005* (2013.01); *G02B 6/005* (2013.01); *G02B 6/0066* (2013.01);
(Continued)

(58) Field of Classification Search
CPC ...... G02B 6/005; G02B 6/0066; G02B 26/00; G02B 26/005; G02B 5/1866;
(Continued)

(56) References Cited

U.S. PATENT DOCUMENTS 3,980,395 A * 9/1976 Giallorenzi ........... G02F 1/1326
349/196
2010/0289870 A1* 11/2010 Leister .................... G02B 30/27
348/40

(Continued)

FOREIGN PATENT DOCUMENTS

| CN | 106125293 A | 11/2016 |
|---|---|---|
| CN | 106597658 | 4/2017 |
| CN | 106597658 A | 4/2017 |

OTHER PUBLICATIONS

First Office Action for Chinese Patent Application No. 201810005113.9 dated Nov. 14, 2019.

*Primary Examiner* — Jie Lei
(74) *Attorney, Agent, or Firm* — Calfee, Halter & Griswold LLP

(57) ABSTRACT

A display panel includes: a first substrate; a second substrate disposed opposite to the first substrate; a waveguide layer disposed on a surface of the first substrate facing the second substrate for coupling incident light into the waveguide layer; a first electrode layer disposed on the waveguide layer, the first electrode layer including a plurality of independently controllable first electrodes; a second electrode layer disposed on a surface of the first substrate facing the second substrate; and a light emission control layer disposed between the first and the second electrode layers, the light emission control layer defining a plurality of sub-pixels arranged in an array. The light emission control layer controls respective amounts of light to be coupled out of the waveguide layer to respective ones of the plurality of sub-pixels based on respective voltages applied between the plurality of first electrodes and the second electrode layer.

16 Claims, 5 Drawing Sheets

(51) Int. Cl.
    *G09G 3/20* (2006.01)
    *F21V 8/00* (2006.01)
(52) U.S. Cl.
    CPC ........... *G09G 3/2003* (2013.01); *G09G 3/348* (2013.01); *G09G 2300/0443* (2013.01); *G09G 2320/0242* (2013.01); *G09G 2320/0666* (2013.01)
(58) Field of Classification Search
    CPC .. G02B 5/1814; G02B 2207/115; G09G 3/34; G09G 3/20; G09G 3/348; G09G 3/2003; G09G 2300/0404; G09G 2300/0426; G09G 2300/0443; G09G 2320/0242; G09G 2320/0666
    USPC ....... 359/228, 290–297; 345/48, 73–76, 107, 345/184
    See application file for complete search history.

(56) References Cited

U.S. PATENT DOCUMENTS

2018/0315380 A1   11/2018  Xiao et al.
2019/0310456 A1*  10/2019  Meng .................. G02B 5/1866

* cited by examiner

DISPLAY PANEL AND DISPLAY DEVICE

CROSS-REFERENCE TO RELATED APPLICATIONS

This application claims the benefit of Chinese Patent Application No. 201810005113.9 filed on Jan. 3, 2018, the entire disclosure of which is incorporated herein by reference.

TECHNICAL FIELD

The present disclosure relates to the field of display technology, and in particular to a display panel and a display device including the display panel.

BACKGROUND

Existing display technologies such as liquid crystal displays (LCDs) and organic light emitting diode (OLED) displays are limited in transmittance and resolution. The LCDs have a limited transmittance because they are provided with functional layers such as thin film transistors, a color filter layer, a polarizer, and the like, which functional layers lead to a significant light loss. Likewise, OLED displays are provided with thin film transistors and a large number of layers, resulting in a reduced transmittance. In addition, due to manufacturing processes, pixels in LCD and OLED displays have relatively large sizes, making it difficult to achieve high resolution.

SUMMARY

According to an aspect of the present disclosure, a display panel is provided comprising: a first substrate; a second substrate disposed opposite to the first substrate; a waveguide layer disposed on a surface of the first substrate facing the second substrate for coupling incident light into the waveguide layer; a first electrode layer disposed on the waveguide layer, the first electrode layer comprising a plurality of first electrodes that are independently controllable; a second electrode layer disposed on a surface of the second substrate facing the first substrate; and a light emission control layer disposed between the first electrode layer and the second electrode layer, the light emission control layer defining a plurality of sub-pixels arranged in an array. The light emission control layer is configured to control respective amounts of light to be coupled out of the waveguide layer to respective ones of the plurality of sub-pixels based on respective voltages applied between the plurality of first electrodes and the second electrode layer.

In some embodiments, the light emission control layer comprises: an insulating layer disposed on a surface of the first electrode layer facing the second substrate; an oily medium disposed between the insulating layer and the second electrode layer, the oily medium distributed in the plurality of sub-pixels; and an aqueous medium disposed between the insulating layer and the second electrode layer, the aqueous medium distributed in the plurality of sub-pixels.

In some embodiments, the insulating layer comprises a hydrophobic insulating material, the oily medium comprises a conductive medium, and the aqueous medium comprises an insulating medium. The oily medium is configured to change respective contact angles of the oily medium on the insulating layer in the respective sub-pixels based on the respective voltages applied between the plurality of first electrodes and the second electrode layer, thereby changing the respective amounts of light coupled out of the waveguide layer to the respective sub-pixels.

In some embodiments, the light emission control layer further comprises a grating layer disposed on a surface of the insulating layer facing the second substrate. The grating layer has gaps formed periodically to allow the oily medium and the aqueous medium to be in contact with the insulating layer.

In some embodiments, the insulating layer comprises at least one of a hydrophobic insulating material or a lipophilic insulating material. In an initial state where the respective voltages are not applied, the gaps of the grating layer are filled with the oily medium and the oily medium has a thickness greater than a height of the grating layer.

In some embodiments, the grating layer has a refractive index greater than or equal to a refractive index of the aqueous medium and less than a refractive index of the oil medium.

In some embodiments, the grating layer has a same grating period in the plurality of sub-pixels.

In some embodiments, the insulating layer comprises an aqueous insulating material, the oily medium comprises an insulating medium, and the aqueous medium comprises a conductive medium. The aqueous medium is configured to change respective contact angles of the aqueous medium on the insulating layer in the respective sub-pixels based on the respective voltages applied between the plurality of first electrodes and the second electrode layer, thereby changing the respective amounts of light coupled out of the waveguide layer to the respective sub-pixels.

In some embodiments, the insulating layer comprises an oleophobic insulating material, the oily medium comprises an insulating medium, and the aqueous medium comprises a conductive medium. The aqueous medium is configured to change respective contact angles of the aqueous medium on the insulating layer in the respective sub-pixels based on the respective voltages applied between the plurality of first electrodes and the second electrode layer, thereby changing the respective amounts of light coupled out of the waveguide layer to the respective sub-pixels.

In some embodiments, the insulating layer comprises a lipophilic insulating material, the oily medium comprises a conductive medium, and the aqueous medium comprises an insulating medium. The oily medium is configured to change respective contact angles of the oily medium on the insulating layer in the respective sub-pixels based on the respective voltages applied between the plurality of first electrodes and the second electrode layer, thereby changing the respective amounts of light coupled out of the waveguide layer to the respective sub-pixels.

In some embodiments, the oily medium comprises red ink, green ink, and blue ink that are respectively distributed in different ones of the plurality of sub-pixels.

In some embodiments, the oily medium comprises black ink distributed in each of the plurality of sub-pixels.

In some embodiments, the light emission control layer comprises a plurality of barrier walls intersecting each other to define the plurality of sub-pixels.

According to another aspect of the present disclosure, a display device is provided comprising a display panel. The display panel comprises: a first substrate; a second substrate disposed opposite to the first substrate; a waveguide layer disposed on a surface of the first substrate facing the second substrate for coupling incident light into the waveguide layer; a first electrode layer disposed on the waveguide layer, the first electrode layer comprising a plurality of first electrodes that are independently controllable; a second electrode layer disposed on a surface of the second substrate facing the first substrate; and a light emission control layer disposed between the first electrode layer and the second electrode layer, the light emission control layer defining a plurality of sub-pixels arranged in an array. The light emission control layer is configured to control respective amounts of light to be coupled out of the waveguide layer to respective ones of the plurality of sub-pixels based on respective voltages applied between the plurality of first electrodes and the second electrode layer.

In some embodiments, the display device further comprises an edge-lit collimated backlight for providing the incident light to be coupled into the waveguide layer.

These and other aspects of the present disclosure will be apparent from and elucidated with reference to the embodiment(s) described hereinafter.

BRIEF DESCRIPTION OF THE DRAWINGS

The accompanying drawings are provided for a further understanding of the present disclosure and form a part of the specification. The accompanying drawings together with the exemplary embodiments described below are used to illustrate the technical solutions of the present disclosure, and do not constitute a limitation of the present disclosure. The drawings are not necessarily drawn to scale.

DETAILED DESCRIPTION

Figure 1:
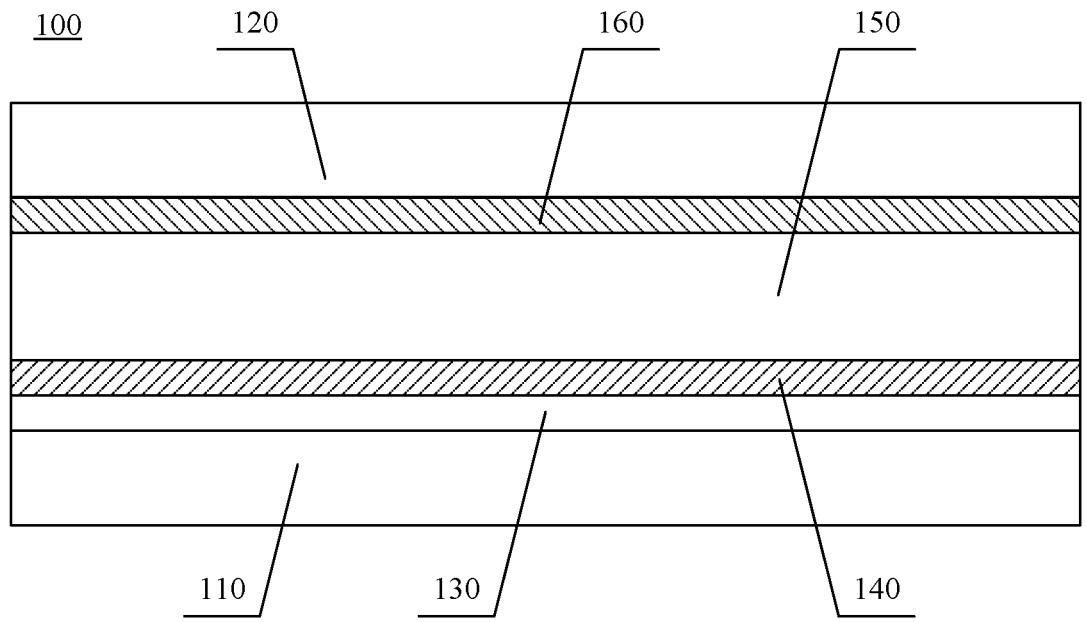
FIG. 1 is a schematic cross-sectional view generally illustrating a display panel according to an embodiment of the present disclosure.

Embodiments of the present disclosure will be further described in detail below with reference to the accompanying drawings. The embodiments and the features in the embodiments may be combined with each other arbitrarily where there is no conflict. The same reference numerals indicate the same elements.

FIG. 1 is a schematic cross-sectional view generally illustrating a display panel 100 according to an embodiment of the present disclosure. As shown in FIG. 1, the display panel 100 includes a first substrate 110 and a second substrate 120 disposed opposite to each other, a waveguide layer 130 and a first electrode layer 140 disposed on the first substrate 110, a second electrode layer 160 disposed on the second substrate 120, and a light emission control layer 150 disposed between the first electrode layer 140 and the second electrode layer 160. The waveguide layer 130 serves to couple incident light into the waveguide layer 130. The light emission control layer 150 is used to couple a set amount of light from the waveguide layer 130 under the control of voltages applied to the first electrode layer 140 and the second electrode layer 160. Due to omission of the polarizer, the color film layer, and the black matrix, the display panel 100 is expected to have a high transmittance.

Figure 2:
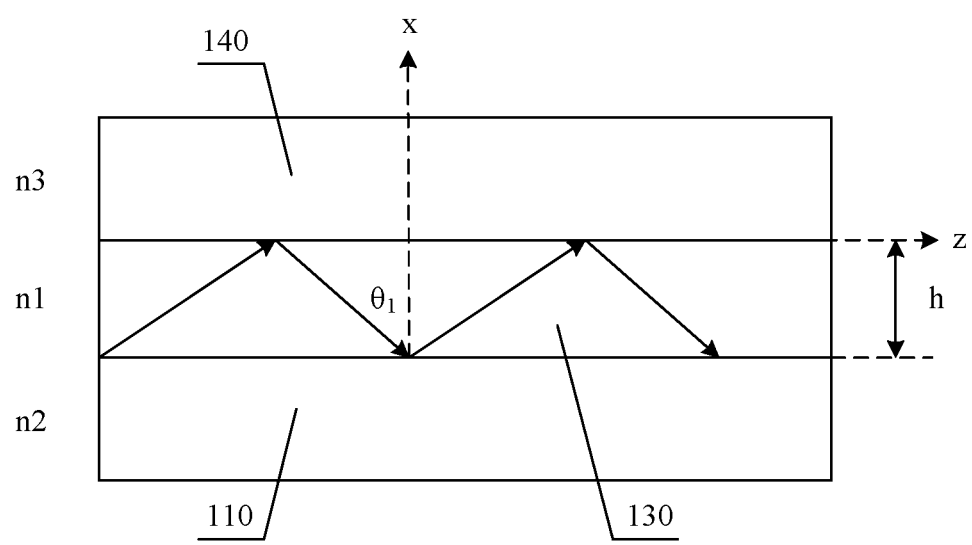
FIG. 2 is a schematic diagram illustrating the operation of a waveguide layer in FIG. 1.

The concept of the present disclosure relates to waveguide coupling, the principle of which is described below in connection with FIG. 2. As shown in FIG. 2, the waveguide layer 130 is located between the first substrate 110 and the first electrode layer 140, wherein the waveguide layer 130 has a refractive index $n_1$, the first substrate 110 has a refractive index $n_2$, and the first electrode layer 140 has a refractive index $n_3$ ($n_1 > n_2 \geq n_3$). In some embodiments, the difference between the refractive index $n_1$ of the waveguide layer 130 and the refractive index $n_2$ of the first substrate 110 may be between $10^{-1}$ and $10^{-3}$. Light is confined to propagate in the waveguide layer 130. Specifically, as shown in FIG. 2, the light travels along a zig-zag path in a z-direction in the waveguide layer 130, and is constrained in an x-direction. This is because the incident light is totally reflected when an incident angle $\theta_1$ of the incident light exceeds a critical angle $\theta_0$. The critical angle $\theta_0$ can be calculated as:

$$\sin\theta_0 = \frac{n_2}{n_1}.$$

In the case of total reflection, a certain phase transition occurs at the reflection point. From the following Fresnel reflection formula $$R_{TE} = \frac{n_1\cos\theta_1 - \sqrt{n_2^2 - n_1^2\sin^2\theta_1}}{n_1\cos\theta_1 + \sqrt{n_2^2 - n_1^2\sin^2\theta_1}}$$

$$R_{TM} = \frac{n_2^2\cos\theta_1 - n_1\sqrt{n_2^2 - n_1^2\sin^2\theta_1}}{n_2^2\cos\theta_1 + n_1\sqrt{n_2^2 - n_1^2\sin^2\theta_1}},$$

the phase transitions $\phi_{TM}$ and $\phi_{TE}$ at the reflection point can be derived as:

$$\tan\phi_{TE} = \frac{\sqrt{\beta^2 - k_0^2 n_2^2}}{\sqrt{k_0^2 n_1^2 - \beta^2}}$$

$$\tan\phi_{TM} = \frac{n_1^2\sqrt{\beta^2 - k_0^2 n_2^2}}{n_2^2\sqrt{k_0^2 n_1^2 - \beta^2}}$$

where $\beta = k_0 n_1 \sin\theta_1$ is the propagation constant of the light, $k_0 = 2\pi\lambda$ is the wave number of the light in vacuum, and $\lambda$ is the wavelength of the light.

To make the light propagate stably in the waveguide layer 130, it is required that:

$$2kh - 2\phi_{12} - 2\phi_{13} = 2m\pi, \quad m = 0, 1, 2, 3 \ldots$$

The above equation is known as the dispersion equation of the plate waveguide, where $k = k_0 n_1 \cos\theta_1$, $\phi_{12}$ and $\phi_{13}$ are the total reflection phase differences, h is the thickness of the waveguide layer, and m is a modular number, i.e., a positive integer starting from zero.

In exemplary embodiments, the waveguide layer 130 may be formed of a transparent material such as $Si_3N_4$ or the like. To ensure total reflection of the light in the waveguide layer 130, the higher the refractive index $n_1$ of the waveguide layer 130, the better. The waveguide layer 130 may be a single-mode waveguide, i.e., its thickness should be sufficiently thin, such as 100 nm. If the incident light has good collimation, or the mode in which the incident light is coupled into the waveguide layer 130 can be effectively controlled, the thickness of the waveguide layer 130 may be selected to be hundreds of nanometers or even several micrometers. In exemplary embodiments, the first substrate 110 and the second substrate 120 may be made of, for example, glass or resin. The first and second substrates 110 and 120 may have a thickness in a range of, for example, 0.1 to 2 mm and a refractive index smaller than the refractive index of the waveguide layer 130. The first electrode layer 140 and the second electrode layer 160 may be made of a transparent conductive material such as magnesium fluoride ($MgF_2$), indium tin oxide (ITO), indium zinc oxide (IZO), or the like. The first electrode layer 140 and the second electrode layer 160 may have a thickness in a range of, for example, 50 to 1000 nm and a refractive index smaller than the refractive index of the waveguide layer 130. In exemplary embodiments, the first substrate 110 and the waveguide layer 130 may be integrally structured. The first electrode layer 140 may be in direct or indirect contact with the waveguide layer 130. The second electrode layer 160 may be in direct or indirect contact with the second substrate 120.

The first substrate 110 and the first electrode layer 140 serve as auxiliary waveguides. Since the thickness of the first substrate 110 and the first electrode layer 140 is greater than the thickness of the waveguide layer 130, most of the incident light will be coupled into the first substrate 110 and the first electrode layer 140. Since the refractive indexes of the first substrate 110 and the first electrode layer 140 are smaller than the refractive index of the waveguide layer 130, the light will not be well confined in the first substrate 110 and the first electrode layer 140 but will be continuously injected into the waveguide layer 130, supplementing an attenuation of the waveguide modes in the waveguide layer 130 due to propagation or coupling.

Figure 3:
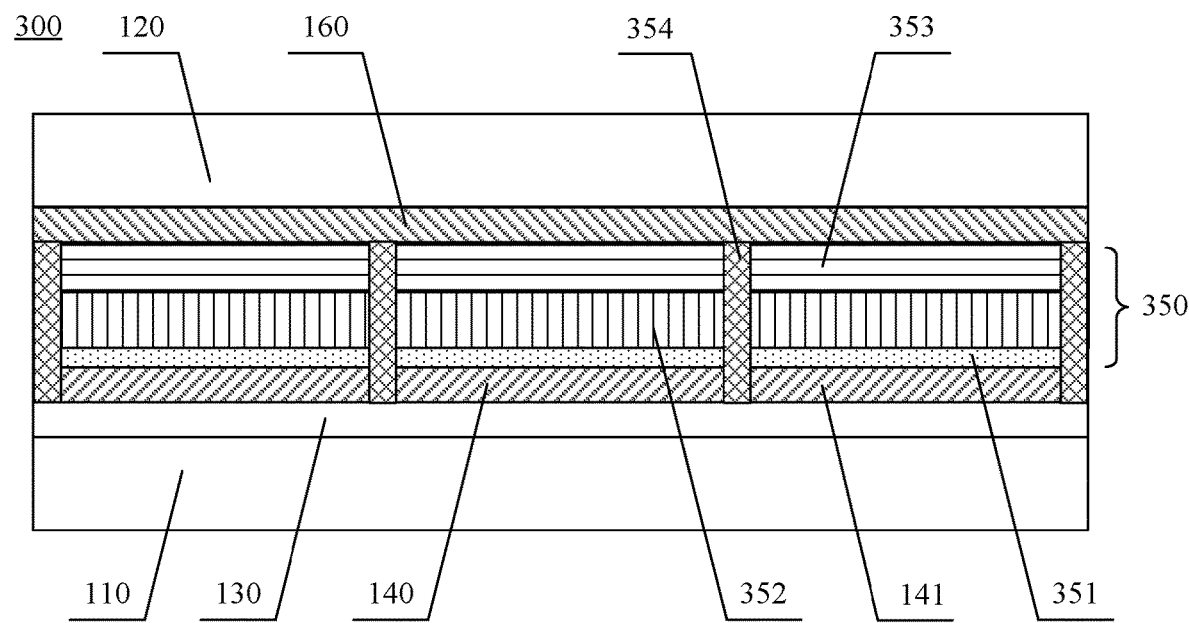
FIG. 3 is a schematic cross-sectional view of a display panel according to an embodiment of the present disclosure, illustrating a light emission control layer in more detail.

FIG. 3 is a schematic cross-sectional view of a display panel 300 according to an embodiment of the present disclosure, illustrating the light emission control layer in more detail. The display panel 100 of FIG. 1 may take the form of the display panel 300.

As shown in FIG. 3, the display panel 300 includes a first substrate 110 and a second substrate 120 disposed opposite to each other, a waveguide layer 130 disposed on the first substrate 110, a second electrode layer 160 disposed on the second substrate 120, and a first electrode layer 140 disposed on the waveguide layer 130, and a light emission control layer 350 disposed between the first electrode layer 140 and the second electrode layer 160. The light emission control layer 350 includes a plurality of barrier walls 354 that defines a plurality of sub-pixels. The barrier walls 354 also function to eliminate or alleviate cross-coloring between adjacent ones of the sub-pixels. In the example of FIG. 3, the plurality of barrier walls 354 further extends through the first electrode layer 140, dividing the first electrode layer 140 into a plurality of independently controllable first electrodes 141. As will be described later, the light emission control layer 350 is operable to control respective amounts of light to be coupled out of the waveguide layer 130 to respective ones of the plurality of sub-pixels depending on respective voltages applied between the plurality of first electrodes 141 and the second electrode layer 160.

Figure 4:
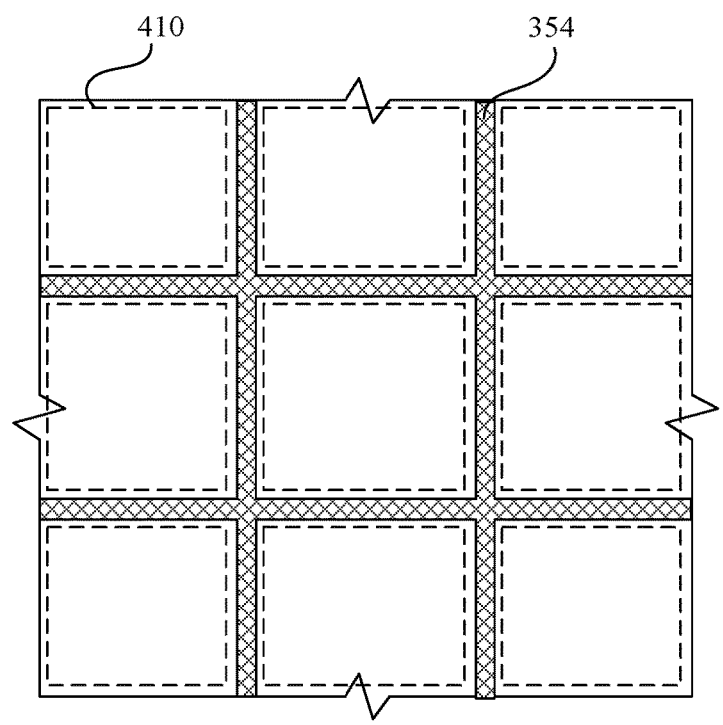
FIG. 4 is a schematic plan view illustrating the arrangement of sub-pixels in FIG. 3.

FIG. 4 is a schematic plan view illustrating the arrangement of the sub-pixels in FIG. 3. As shown in FIG. 4, the plurality of barrier walls 354 intersect each other to define a plurality of sub-pixels 410 arranged in an array, each of which is indicated by a dashed box. In exemplary embodiments, these sub-pixels 410 may include a red sub-pixel, a green sub-pixel, and a blue sub-pixel. It will be understood that the arrangement of the sub-pixels in FIG. 4 is exemplary and that in other embodiments the plurality of sub-pixels 410 may be arranged in any suitable pattern (e.g., RGBW). It will also be understood that although not shown in FIG. 4, the plurality of first electrodes 141 of FIG. 3 may also have the same arrangement as the sub-pixels 410.

Referring back to FIG. 3, the light emission control layer 350 includes an insulating layer 351 disposed on a surface of the first electrode layer 140 facing the second substrate 120, an oily medium 352 disposed between the insulating layer 351 and the second electrode layer 160 and distributed in the plurality of sub-pixels, and an aqueous medium 353 disposed between the insulating layer 351 and the second electrode layer 160 and distributed in the plurality of sub-pixels. The oily medium 352 has a relatively large refractive index (typically greater than 1.8). In the case of color display, the oily medium 352 in the red sub-pixel, the green sub-pixel, and the blue sub-pixel includes red ink, green ink, and blue ink, respectively. In the case of monochrome display, the oily medium 352 in all sub-pixels includes black ink.

In the present embodiment, the oily medium 352 includes a conductive medium, the aqueous medium 353 includes an insulating medium, and the insulating layer 351 includes a hydrophobic insulating material. The conductive oily medium 352 can be obtained by, for example, adding conductive particles to an ordinary ink or using an electronic ink, and the insulating aqueous medium 353 can assume pure water from which the electrolyte has been removed. With this configuration, the oily medium 352 is operable to change respective contact angles of the oily medium 352 on the insulating layer 351 in the respective sub-pixels depending on the respective voltages applied between the plurality of first electrodes 141 and the second electrode layer 160, thereby changing the respective amounts of light coupled out of the waveguide layer 130 to the respective sub-pixels.

Figure 5:
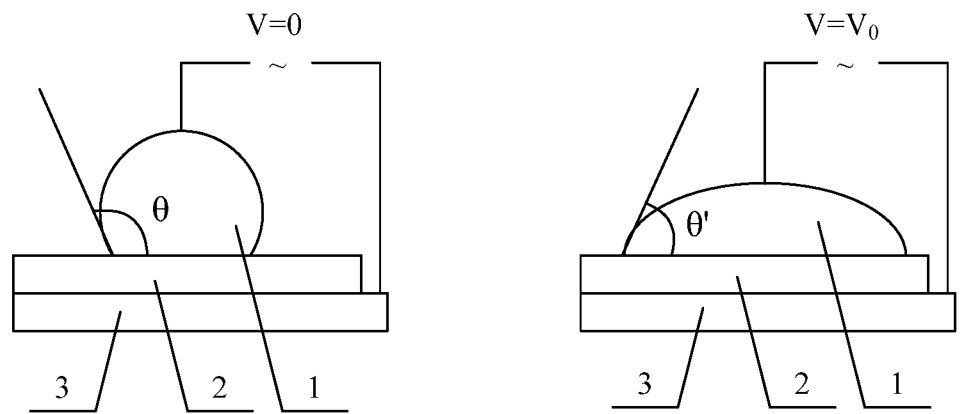
FIG. 5 is a schematic diagram illustrating the principle of electrowetting.

The manipulation of the oily medium 352 can be based on electrowetting, the principle of which is described below in connection with FIG. 5. Electrowetting is a phenomenon in which the contact angle of a conductive droplet on an insulating substrate can be changed by changing the voltage applied to the droplet. FIG. 5 schematically shows a change in the contact angle of a droplet 1 on an insulating substrate 2 before and after a voltage is applied. When no voltage is applied between the electrode 3 and the droplet 1 (V=0), the contact angle of the droplet 1 on the substrate 2 is θ. When a voltage is applied between the electrode 3 and the droplet 1 (V=$V_0$), the contact angle of the droplet 1 on the substrate 2 becomes θ', resulting in deformation and displacement of the droplet 1. Electrowetting may be advantageously used to manipulate the oily medium 352 and/or the aqueous medium 353 in the present disclosure.

Figure 6:
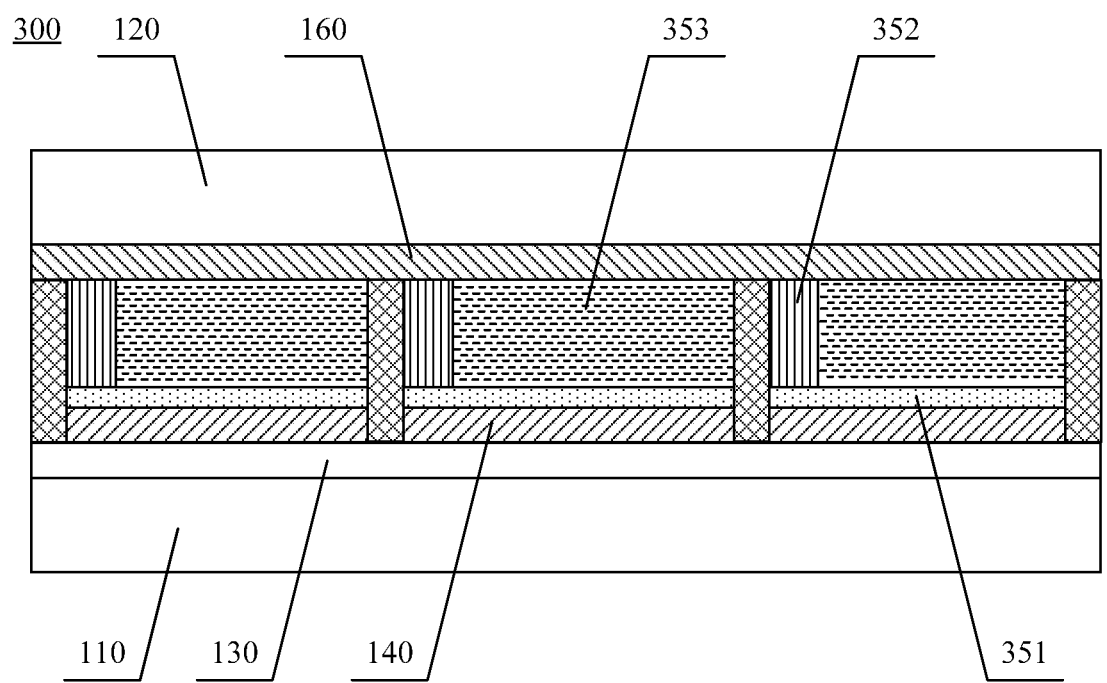
FIG. 6 is a schematic cross-sectional view of the display panel of FIG. 3 in a grayscale state of L0.

FIG. 6 is a schematic cross-sectional view of the display panel 300 of FIG. 3 in a grayscale state of L0. In the state shown in FIG. 6, a voltage (V=Vmax) is applied between the first electrode layer 140 and the second electrode layer 160, and thus the contact angle of the droplet of the oily medium 352 on the insulating layer 351 is changed. As shown in FIG. 6, the oily medium 352 in the sub-pixels is shifted to one side so that almost the entire area of the insulating layer 351 is covered by the aqueous medium 353. Due to the small refractive index of the aqueous medium 353, the light cannot be coupled out of the waveguide layer 130. Therefore, the display panel 300 displays a grayscale of L0.

Figure 7:
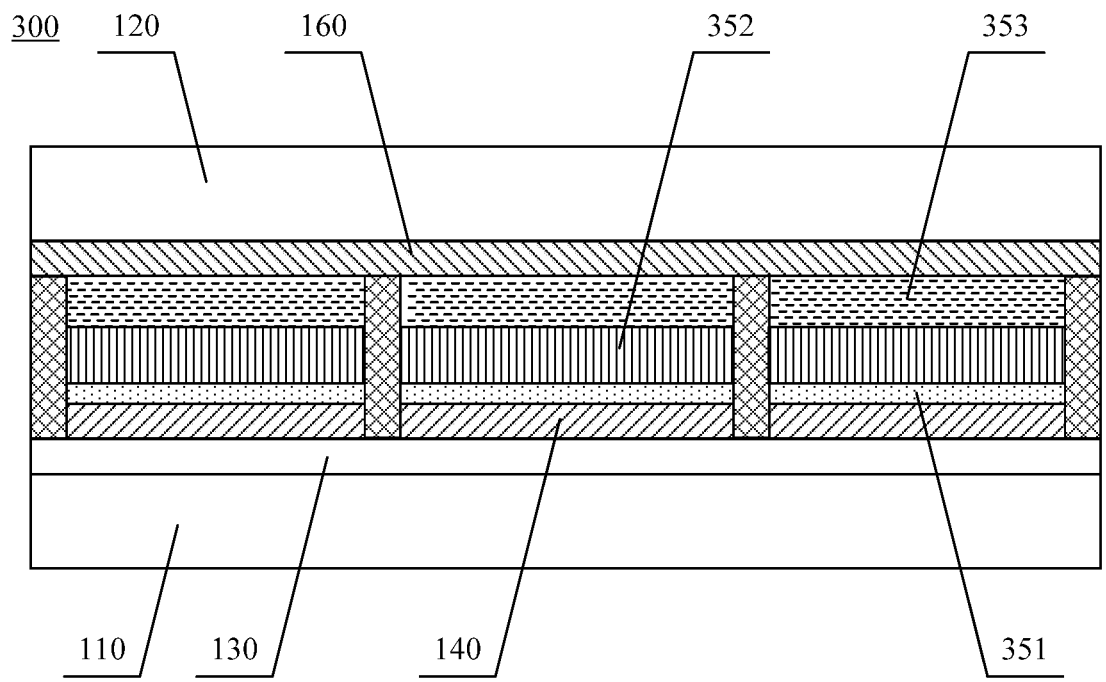
FIG. 7 is a schematic cross-sectional view of the display panel of FIG. 3 in a grayscale state of L255.

FIG. 7 is a schematic cross-sectional view of the display panel 300 of FIG. 3 in a grayscale state of L255. In the state shown in FIG. 7, no voltage (V=0) is applied between the first electrode layer 140 and the second electrode layer 160. Due to the repulsion of the hydrophobic insulating layer 351, the aqueous medium 353 is located above the oily medium 352 so that the oily medium 352 covers the insulating layer 351. Due to the larger refractive index of the oily medium 352, a large amount of light is coupled out of the waveguide layer 130. Therefore, the display panel 300 displays a grayscale of L255.

When the voltage applied to the first electrode layer 140 and the second electrode layer 160 is between 0 and Vmax, the coverage of the oily medium 352 on the insulating layer 351 is between the above two states. Different voltages result in different degrees of coverage of the insulating layer 351 by the oily medium 352 and the aqueous medium 353 and thus different amounts of light coupled out of the waveguide layer 130, thereby achieving different grayscale displays.

Due to the fact that (1) the polarizer, the color film layer, and the black matrix are omitted in the display panel 300, and (2) each layer of the display panel 300 is made of a transparent material, the display panel 300 is expected to have high transmittance. Meanwhile, the sub-pixels 410 in the display panel 300 may have a small size, for example, in the micrometer or nanometer scale, and thus a high resolution is also expected. Further, the electrowetting technology allows for a faster response speed and a wider viewing angle range.

Figure 8:
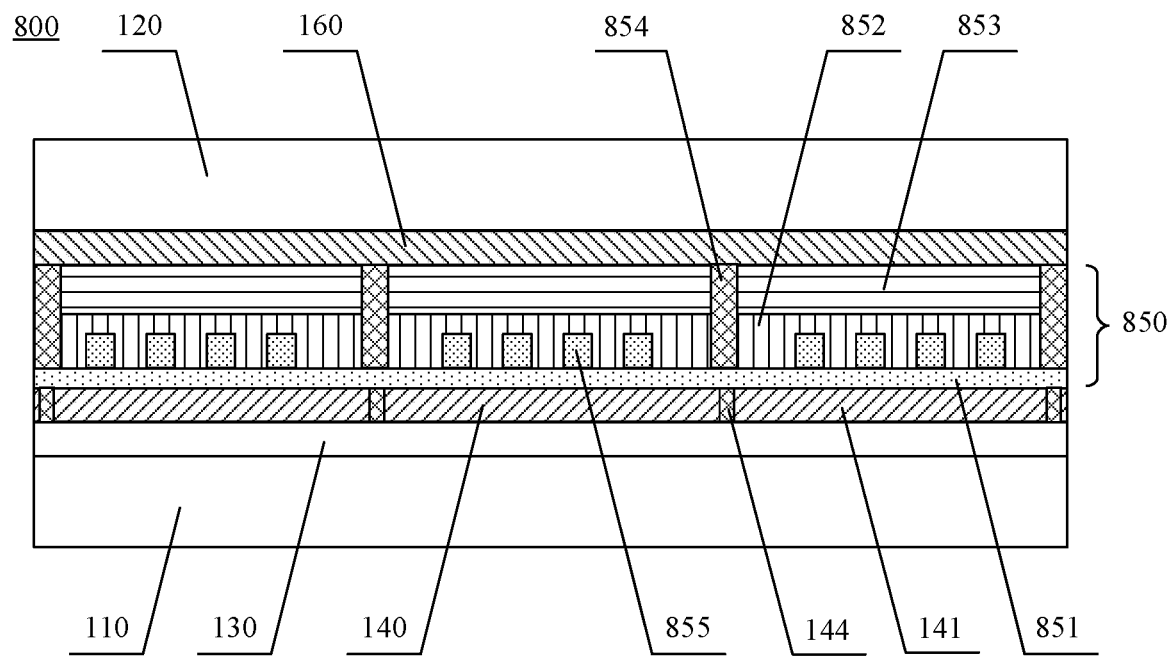
FIG. 8 is a schematic cross-sectional view of a display panel according to another embodiment of the present disclosure, illustrating a light emission control layer in more detail.

FIG. 8 is a schematic cross-sectional view of a display panel 800 according to another embodiment of the present disclosure, illustrating the light emission control layer in more detail. The display panel 100 of FIG. 1 may take the form of the display panel 800.

As shown in FIG. 8, the display panel 800 includes a first substrate 110 and a second substrate 120 disposed opposite to each other, a waveguide layer 130 disposed on the first substrate 110, a second electrode layer 160 disposed on the second substrate 120, a first electrode layer 140 disposed on the waveguide layer 130, and a light emission control layer 850 disposed between the first electrode layer 140 and the second electrode layer 160. The light emission control layer 850 includes a plurality of barrier walls 854 that defines a plurality of sub-pixels. In the example of FIG. 8, the first electrode layer 140 also includes a plurality of barrier walls 144 that divides the first electrode layer 140 into a plurality of independently controllable first electrodes 141. The plurality of sub-pixels and the plurality of first electrodes 141 of the display panel 800 may be arranged in a pattern as shown in FIG. 4 or any other suitable pattern.

Different from the display panel 300 of FIG. 3, in the display panel 800, the light emission control layer 850 includes not only an insulating layer 851 disposed on a surface of the first electrode layer 140 facing the second substrate 120, an oily medium 852 disposed between the insulating layer 851 and the second electrode layer 160 and distributed in the plurality of sub-pixels, and an aqueous medium 853 disposed between the insulating layer 851 and the second electrode layer 160 and distributed in the plurality of sub-pixels, but also includes a grating layer 855 disposed on a surface of the insulating layer 851 facing the second substrate 120. As shown in FIG. 8, the grating layer 855 has gaps formed periodically for allowing the oily medium 852 and the aqueous medium 853 to be in contact with the insulating layer 851.

In the present embodiment, the insulating layer 851, the oily medium 852, and the aqueous medium 853 may have the same configurations as those described previously with respect to FIGS. 3-7. Specifically, the oily medium 852 includes a conductive medium, the aqueous medium 853 includes an insulating medium, and the insulating layer 851 includes a hydrophobic insulating material. In some embodiments, the grating layer 855 is formed of a transparent material, such as SiO$_2$ or a resin, etc., which has a refractive index between the refractive index of the aqueous medium 853 and the refractive index of the oily medium 852 and has a height in a range of 200 nm to 1200 nm, for example, 500 nm. In some embodiments, the refractive index of the grating layer 855 may be the same as the refractive index of the aqueous medium 853.

The provision of the grating 855 improves the efficiency of out-coupling of the light from the waveguide layer 130. The coupling relationship for the grating 855 coupling light from the waveguide layer 130 is:

$$k_0 n_c \sin\theta_i = k_0 N_m - q 2\pi / \Lambda \ (q = 0, \pm 1, \pm 2, \dots )$$

where $k_0 N_m$ is the propagation constant of the m-order guided mode, $N_m$ is the effective refractive index of the m-order guided mode, $\Lambda$ is the grating period, $\theta_i$ is the angle between the wavevector direction of the incident light (or outgoing light) and the vertical direction, and $n_c$ is the refractive index of the air. Satisfying the above relationship, the incident light can excite the m-order guided mode in the waveguide, and the m-order guided mode can be coupled out.

The outgoing light can be determined according to the following diffraction grating formula:

$$n_i \sin\theta_i - n_d \sin\theta_d = m * \lambda / \Lambda \ (m = 0, \pm 1, \pm 2, \dots )$$

where $n_i$ and $\theta_i$ are respectively the refractive index and incident angle of the incident space, m is the diffraction order, $\Lambda$ is the grating period, $\lambda$ is the incident light wavelength, $\theta_d$ is the exit angle, i.e., the angle between the exit direction and the normal to the panel plane, and $n_d$ is the equivalent refractive index of the oily medium 852, the second electrode layer 160, and the second substrate 120. In general, the refractive indices of the oily medium 852, the second electrode layer 160, and the second substrate 120 are very close, so that $n_d$ can assume an arithmetic average of the three.

With this configuration, the oily medium 852 is operable to change respective contact angles of the oily medium 852 on the insulating layer 851 in the respective sub-pixels depending on the respective voltages applied between the plurality of first electrodes 141 and the second electrode layer 160, thereby changing the respective amounts of light coupled out of the waveguide layer 130 to the respective sub-pixels.

Figure 9:
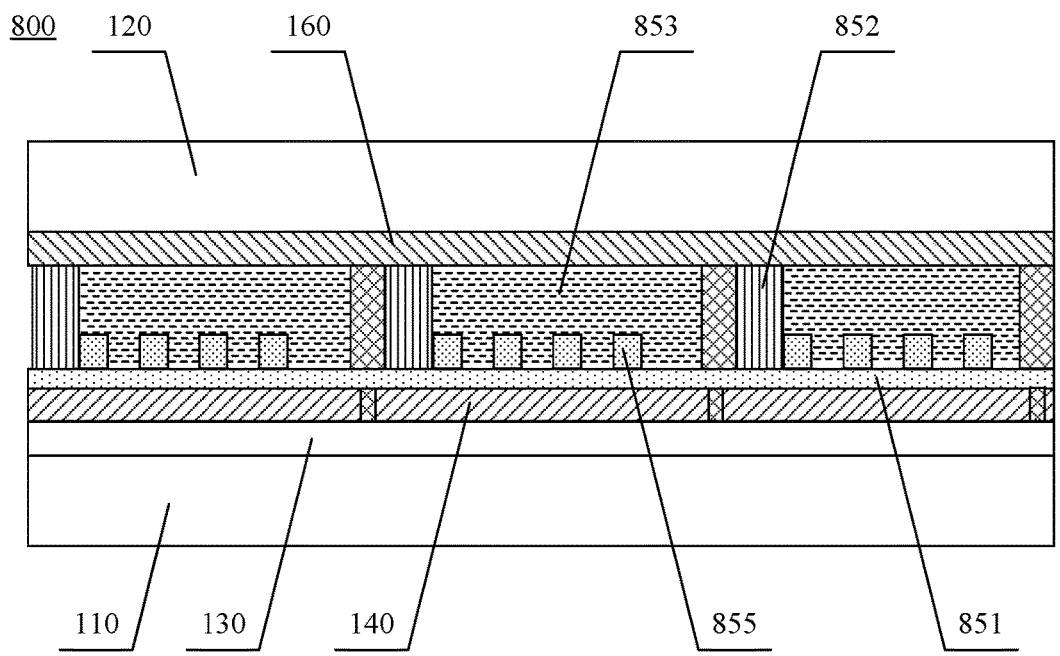
FIG. 9 is a schematic cross-sectional view of the display panel of FIG. 8 in a grayscale state of L0.

FIG. 9 is a schematic cross-sectional view of the display panel 800 of FIG. 8 in a grayscale state of L0. In the state shown in FIG. 9, a voltage (V=Vmax) is applied between the first electrode layer 140 and the second electrode layer 160, and thus the contact angles of the droplets of the oily medium 852 on the insulating layer 851 is changed. As shown in FIG. 9, the oily medium 852 in each sub-pixel is shifted to one side so that almost the entire area of the insulating layer 851 is covered by the aqueous medium 853. Since the refractive index of the grating layer 855 and the refractive index of the aqueous medium 853 are close or the same, the grating layer 855 does not function so that the light in the waveguide layer 130 cannot be coupled out. Therefore, the display panel 800 displays a grayscale of L0.

Figure 10:
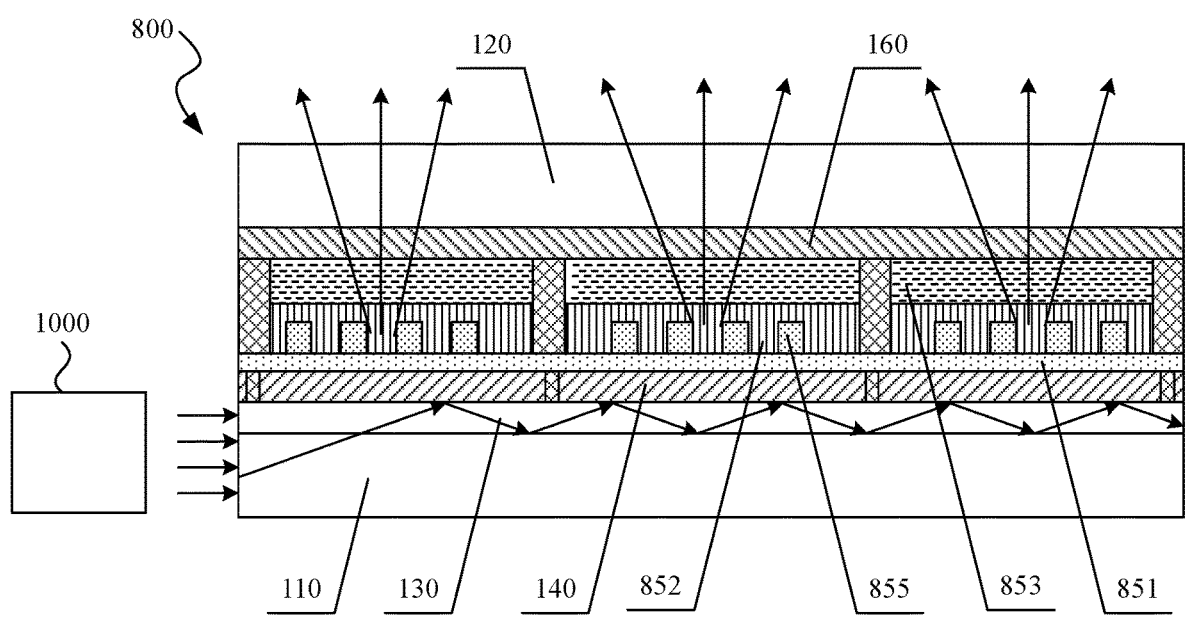
FIG. 10 is a schematic cross-sectional view of the display panel of FIG. 8 in a grayscale state of L255.

FIG. 10 is a schematic cross-sectional view of the display panel 800 of FIG. 8 in a grayscale state of L255. In the state shown in FIG. 10, no voltage (V=0) is applied between the first electrode layer 140 and the second electrode layer 160. Due to the repulsion of the hydrophobic insulating layer 851, the aqueous medium 853 is located above the oily medium 852 so that the oily medium 852 covers the grating layer 854 and the insulating layer 851. Due to the large difference between the refractive index of the oily medium 852 and the refractive index of the grating layer 855, a large amount of light is coupled by the grating 855 out of the waveguide layer 130. Therefore, the display panel 800 displays a grayscale of L255. In some embodiments, the oily medium 853 has a thickness greater than a height of the grating layer 855, i.e., the grating 855 is completely immersed in the oily medium 853. This further promotes the improvement of the out-coupling efficiency of light.

When the voltage applied to the first electrode layer 140 and the second electrode layer 160 is between 0 and Vmax, the coverage of the oily medium 852 on the insulating layer 851 is between the above two states. The different voltages result in different degrees of coverage of the insulating layer 851 by the oily medium 852 and the aqueous medium 853 and hence different amounts of light coupled out of the waveguide layer 130, thereby achieving different grayscale displays.

Light of any wavelength can be coupled out of the waveguide layer 130 as long as its incident angle and exit angle satisfy the diffraction grating formula. Therefore, each sub-pixel can emit light of various wavelengths, and the direction of light emission is divergent, as shown in FIG. 10. In some embodiments, the grating layer 855 has the same grating period in all sub-pixels although this is not required. In some embodiments, the grating layer 855 has the same height in all sub-pixels, although this is not required.

The display panel 800 has the same advantages as the display panel 300 described above with respect to FIGS. 3-7. Further, the display panel 800 is expected to have a higher transmittance and finer grayscale control since the grating layer 855 has a higher out-coupling efficiency.

Other embodiments are contemplated in the present disclosure. For example, in some implementations, the insulating layers 351, 851 include an aqueous or oleophobic insulating material, the oily media 352, 852 include an insulating medium, and the aqueous media 353, 853 includes a conductive medium, such as water. In this case, the aqueous media 353, 853 are operable to change respective contact angles of the aqueous media 353, 853 on the insulating layers 351, 851 in the respective sub-pixels depending on the respective voltages applied between the plurality of first electrodes 141 and the second electrode layer 160, thereby changing the respective amounts of light that is coupled out of the waveguide layer 130 to the respective sub-pixels. In some implementations, the insulating layers 351, 851 include an oleophilic insulating material, the oily media 352, 852 include a conductive medium, such as an ink with conductive particles, and the aqueous media 353, 853 include an insulating medium, such as pure water. In this case, the oily media 352, 852 are operable to change respective contact angles of the oily media 352, 852 on the insulating layers 351, 851 in the respective sub-pixels depending on respective voltages applied between the plurality of first electrodes 141 and the second electrode layer 160, thereby changing the respective amounts of light coupled out of the waveguide layer 130 to the respective sub-pixels.

It will be understood that the term "insulating" as used herein does not mean completely non-conductive, but may refer to having relatively weaker electrical conductivity.

An edge-lit collimated backlight 1000 is also shown in FIG. 10 for providing incident light to be coupled into the waveguide layer 130. The edge-lit collimated backlight 1000 can have any suitable configuration. For example, in some embodiments, the edge-lit collimated backlight 1000 may be formed from red, green, and blue semiconductor lasers. In some embodiments, the edge-lit collimated backlight 1000 may be formed from red, green, and blue LEDs that have a good collimation. In some embodiments, the edge-lit collimated backlight 1000 may be formed from white LEDs that have a good collimation. In some embodiments, the edge-lit collimated backlight 1000 may be formed from CCFL strips and collimating elements. The light emission direction of the edge-lit collimated backlight 1000 is at an angle with the normal of the waveguide layer 130/the first substrate 110/the first electrode layer 140 so that the incident light is in total reflection within the waveguide layer 130/the first substrate 110/the first electrode layer 140 while ensuring high out-coupling efficiency.

The edge-lit collimated backlight 1000 together with the display panel 300 or 800 forms a display device. The display device may be any product or component having a display function such as a Virtual Reality (VR) helmet, VR glasses, a mobile phone, a tablet computer, a television, a display, a notebook computer, a digital photo frame, a navigator, and the like.

It will be understood that the terms "middle", "upper", "lower", "front", "back", "vertical", "horizontal", "top", "bottom", "inside", "outside" or the like as used herein are based on the orientation or positional relationship shown in the drawings, and does not indicate or imply a specific orientation or positional relationship, and thus cannot be interpreted as limiting the present disclosure.

It will be understood that when an element or layer is referred to as being "on" another element or layer, "coupled to another element or layer," or "adjacent to another element or layer," it can be directly on the another element or layer, directly coupled to another element or layer, or directly adjacent to another element or layer, or there may be an intermediate element or layer. In contrast, when an element is referred to as being "directly on another element or layer," "directly coupled to another element or layer," "directly adjacent another element or layer," no intervening elements or layers may be present. However, in any case "on" or "directly on" should not be construed as requiring a layer to completely cover the underlying layer.

Variations and modifications to the disclosed embodiments can be made by those skilled in the art without departing from the scope of the present disclosure. The scope of the disclosure is defined by the appended claims.

What is claimed is:

1. A display panel comprising:
   a first substrate;
   a second substrate disposed opposite to the first substrate;
   a waveguide layer disposed on a surface of the first substrate facing the second substrate such that incident light is coupled into the waveguide layer;
   a first electrode layer disposed on the waveguide layer, wherein the first electrode layer comprises a plurality of first electrodes that are independently controllable;
   a second electrode layer disposed on a surface of the second substrate facing the first substrate; and
   a light emission control layer disposed between the first electrode layer and the second electrode layer, wherein the light emission control layer defines a plurality of sub-pixels arranged in an array,
   wherein the light emission control layer is configured to control respective amounts of light to be coupled out of the waveguide layer to respective ones of the plurality of sub-pixels based on respective voltages applied between the plurality of first electrodes and the second electrode layer,
   wherein the light emission control layer comprises:
   an insulating layer on a surface of the first electrode layer facing the second substrate;
   an oily medium between the insulating layer and the second electrode layer, the oily medium being distributed in the plurality of sub-pixels; and
   an aqueous medium between the insulating layer and the second electrode layer, the aqueous medium being distributed in the plurality of sub-pixels,
   wherein the light emission control layer further comprises a grating layer disposed on a surface of the insulating layer facing the second substrate, and wherein the grating layer comprises gaps formed periodically to allow the oily medium and the aqueous medium to be in contact with the insulating layer.

2. The display panel of claim 1,
   wherein the insulating layer comprises a hydrophobic insulating material,
   wherein the oily medium comprises a conductive medium,
   wherein the aqueous medium comprises an insulating medium, and
   wherein the oily medium is configured to change contact angles of the oily medium on the insulating layer in the different sub-pixels based on the respective voltages applied between the plurality of first electrodes and the second electrode layer, thereby changing the respective amounts of light coupled out of the waveguide layer to the respective sub-pixels.

3. The display panel of claim 1, wherein the insulating layer comprises at least one of a hydrophobic insulating material or a lipophilic insulating material, wherein in an initial state where the respective voltages are not applied the gaps of the grating layer are filled with the oily medium and the oily medium has a thickness greater than a height of the grating layer.

4. The display panel of claim 3, wherein the grating layer has a refractive index greater than or equal to a refractive index of the aqueous medium and less than a refractive index of the oil medium.

5. The display panel of claim 1, wherein the oily medium comprises red ink, green ink, and blue ink that are each respectively distributed in different ones of the plurality of sub-pixels.

6. The display panel of claim 1, wherein the grating layer has a same grating period in each of the plurality of sub-pixels.

7. The display panel of claim 1,
   wherein the insulating layer comprises an aqueous insulating material,
   wherein the oily medium comprises an insulating medium,
   wherein the aqueous medium comprises a conductive medium, and
   wherein the aqueous medium is configured to change respective contact angles of the aqueous medium on the insulating layer in the respective sub-pixels based on the respective voltages applied between the plurality of first electrodes and the second electrode layer, thereby changing the respective amounts of light coupled out of the waveguide layer to the respective sub-pixels.

8. The display panel of claim 1,
   wherein the insulating layer comprises an oleophobic insulating material,
   wherein the oily medium comprises an insulating medium,
   wherein the aqueous medium comprises a conductive medium, and
   wherein the aqueous medium is configured to change respective contact angles of the aqueous medium on the insulating layer in the respective sub-pixels based on the respective voltages applied between the plurality of first electrodes and the second electrode layer, thereby changing the respective amounts of light coupled out of the waveguide layer to the respective sub-pixels.

9. The display panel of claim 1,
   wherein the insulating layer comprises a lipophilic insulating material,
   wherein the oily medium comprises a conductive medium,
   wherein the aqueous medium comprises an insulating medium, and
   wherein the oily medium is configured to change respective contact angles of the oily medium on the insulating layer in the respective sub-pixels based on the respective voltages applied between the plurality of first electrodes and the second electrode layer, thereby changing the respective amounts of light coupled out of the waveguide layer to the respective sub-pixels.

10. The display panel of claim 1, wherein the oily medium comprises red ink, green ink, and blue ink that are respectively distributed in different ones of the plurality of sub-pixels.

11. The display panel of claim 1, wherein the oily medium comprises black ink distributed in each of the plurality of sub-pixels.

12. The display panel of claim 1, wherein the light emission control layer comprises a plurality of barrier walls intersecting each other to define the plurality of sub-pixels.

13. A display device comprising:
   a display panel comprising:
   a first substrate;
   a second substrate disposed opposite to the first substrate;
   a waveguide layer disposed on a surface of the first substrate facing the second substrate for coupling incident light into the waveguide layer;
   a first electrode layer disposed on the waveguide layer, the first electrode layer comprising a plurality of first electrodes that are independently controllable;
   a second electrode layer disposed on a surface of the second substrate facing the first substrate; and a light emission control layer disposed between the first electrode layer and the second electrode layer, the light emission control layer defining a plurality of sub-pixels arranged in an array, wherein the light emission control layer is configured to control respective amounts of light to be coupled out of the waveguide layer to respective ones of the plurality of sub-pixels based on respective voltages applied between the plurality of first electrodes and the second electrode layer, wherein the light emission control layer comprises:

an insulating layer on a surface of the first electrode layer facing the second substrate;

an oily medium between the insulating layer and the second electrode layer, the oily medium being distributed in the plurality of sub-pixels; and an aqueous medium between the insulating layer and the second electrode layer, the aqueous medium being distributed in the plurality of sub-pixels, wherein the light emission control layer further comprises a grating layer disposed on a surface of the insulating layer facing the second substrate, and wherein the grating layer comprises gaps formed periodically to allow the oily medium and the aqueous medium to be in contact with the insulating layer.

14. The display device of claim 13, wherein the insulating layer comprises at least one of a hydrophobic insulating material or a lipophilic insulating material, wherein in an initial state where the respective voltages are not applied the gaps of the grating layer are filled with the oily medium and the oily medium has a thickness greater than a height of the grating layer.

15. The display device of claim 14, wherein the grating layer has a refractive index greater than or equal to a refractive index of the aqueous medium and less than a refractive index of the oil medium.

16. The display device of claim 13, further comprising an edge-lit collimated backlight for providing the incident light to be coupled into the waveguide layer.

* * * * *